United States Patent
Yoshikawa et al.

(10) Patent No.: US 7,557,958 B2
(45) Date of Patent: Jul. 7, 2009

(54) IMAGE PROCESSOR

(75) Inventors: Satoshi Yoshikawa, Ebina (JP);
Kazunori Kurokawa, Ebina (JP); Seiji Iino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 785 days.

(21) Appl. No.: 11/018,839

(22) Filed: Dec. 22, 2004

(65) Prior Publication Data
US 2005/0179917 A1    Aug. 18, 2005

(30) Foreign Application Priority Data
Feb. 13, 2004   (JP)   ............... 2004-035993

(51) Int. Cl.
*H04N 1/40*   (2006.01)
(52) U.S. Cl. .................. 358/2.1; 358/523; 358/518
(58) Field of Classification Search .......... 358/1.9, 358/2.1, 1.15–1.18, 500, 504, 517–518, 520, 358/523, 527
See application file for complete search history.

(56) References Cited

U.S. PATENT DOCUMENTS

| | | | | |
|---|---|---|---|---|
| 5,313,570 A | * | 5/1994 | Dermer et al. | .............. 345/589 |
| 5,613,046 A | * | 3/1997 | Dermer | ............... 358/1.9 |
| 5,946,460 A | * | 8/1999 | Hohensee et al. | .......... 358/1.18 |
| 5,949,427 A | * | 9/1999 | Nishikawa et al. | .......... 345/593 |
| 2004/0051887 A1 | * | 3/2004 | Nishide et al. | .............. 358/1.9 |

FOREIGN PATENT DOCUMENTS

| | | |
|---|---|---|
| JP | A-10-224614 | 8/1998 |
| JP | A 2000-62253 | 2/2000 |
| JP | A-2002-247403 | 8/2002 |
| JP | A 2003-348366 | 12/2003 |

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

An image processor has a storing unit and a searching unit. The storing unit stores one or more process colors and/or one or more spot colors that is/are different from the one or more process colors according to a predetermined key word. The searching unit extracts the one or more process colors and/or the one or more spot colors stored in the storing unit according to an entered key word.

18 Claims, 8 Drawing Sheets

F I G. 3

| KEY WORD 1 | KEY WORD 2 | SUB-NUMBER | CYAN | MAGENTA | YELLOW | BLACK |
|---|---|---|---|---|---|---|
| FOOD | FISH | 1 | D 174 | D 156 | NOT USED | NOT USED |
| | | 2 | D 173 | D 156 | NOT USED | NOT USED |
| | | 3 | D 175 | D 156 | NOT USED | NOT USED |
| | MEAT | 1 | T xxx | T xxx | NOT USED | NOT USED |
| | | 2 | P xxx | P xxx | NOT USED | NOT USED |
| | RESTAURANT | 1 | xxx | xxx | NOT USED | NOT USED |
| ETHNIC MODE | ETHNIC MODE | 1 | D xxx | D yyy | NOT USED | NOT USED |
| IN THE SIXTY'S FASHION | IN THE SIXTY'S FASHION OF AMERICA | 1 | Xxx | Xxx | NOT USED | NOT USED |
| | IN THE SIXTY'S FASHION OF JAPAN | 1 | Xxx | Yxx | NOT USED | NOT USED |

| D173 | ✓ |
| T456 | |

FIG. 7

SEARCH RESULT DISPLAY

KEY WORD 1     FOOD

KEY WORD 2     FISH

| SUB-NUMBER | (C) CYAN | (M) MAGENTA | (Y) YELLOW | (K) BLACK |
|---|---|---|---|---|
| 1 | D 174 | D 156 | NOT USED | NOT USED |
| 2 | D 173 | D 156 | NOT USED | NOT USED |
| 3 | D 175 | D 156 | NOT USED | NOT USED |

56

IMAGE PROCESSOR

CROSS-REFERENCE TO RELATED APPLICATION

This application claims priority under 35 USC 119 from Japanese Patent Application No. 2004-035993, the disclosure of which is incorporated by reference herein.

BACKGROUND OF THE INVENTION

1. Field of the Invention

The present invention relates to an image processor for performing multicolor printing by using color ink whose color is different from a process color (spot color ink).

2. Description of the Related Art

In DTP (Desktop Publishing), an image is formed, processed, and edited by a processor such as a personal computer or a workstation, so that a page layout is formed, a film to develop the page layout on a printing plate (CEPS) is formed, and it is directly written on a printing plate, to thereby form a press plate for printing (CTP: Computer to Plate).

When proofreading or the like is carried out before printing using the actual press plate, the page layout displayed on a monitor (comprehensive layout) is printed by a printer such as a page printer, using the WYSIWYG function.

Although four colors (process colors) including cyan, magenta, yellow, and black are used in ordinary color printing, an ink of a color different from a process color (hereinafter, referred to as a "spot color") may be used depending on necessity. Recently, two-color printing is sometimes used in order to restrain the printing cost. In this case, one process color and one spot color may be used or two spot colors may be used, in order to attain a special effect.

When a simulation of two-color printing is performed in order to obtain the printing image of a comprehensive layout using spot colors, it is difficult to confirm how the actual printed matter will be finished in the case where no printing image other than that using the process colors can be obtained.

Thus, a method has been proposed of printing a color chart with the actual press plate by using the spot colors to be used for the two-color printing, creating a profile for the spot colors (look-up table of CMYK-L*a*b*) by measuring the color chart, and simulating the printing in the spot colors by realizing the CMYK-C'M'Y'K' conversion using a color management function, with the profile for the spot colors and a profile for a printer (look-up table of L*a*b*-C'M'Y'K')(for example, refer to Japanese Patent Application Laid-Open No. 2000-62253).

Japanese Patent Application No. 2003-71484 provides a method of supplying a color comprehensive layout with each color replaced with each desired ink color (spot color) in a document prepared, for example, in two colors of C, M, Y, and K.

However, when image data for two-color printing is prepared using spot colors, the name of the spot color (type of the spot color) and the ratio of the spot colors have to be considered. However, since there are thousands of spot colors, it is difficult to ascertain each coloring depending on the combinations of only the spot colors and the combinations of a spot color and a process color. Accordingly, there arises a problem in that the same coloring as used in the past cannot be reproduced even when there is a request for the same coloring.

SUMMARY OF THE INVENTION

The present invention has been made in view of the above circumstances and provides an image processor which can easily reproduce the same coloring as was used in the past when performing an N-color printing simulation such as two-color printing.

According to an embodiment of the invention, the invention provides an image processor. The image processor includes a storing unit that stores one or more process colors and/or one or more spot colors that is/are different from the one or more process colors stored according to a predetermined key word. The image processor also has a searching unit that extracts one or more process colors and/or one or more spot colors stored in the storing unit according to an entered key word.

As a result, it is possible to obtain the same colors as was used before, easily and accurately. Further, it is possible to select a proper combination of colors depending on an object or the like when two-color printing is carried out.

BRIEF DESCRIPTION OF THE DRAWINGS

Embodiments of the present invention will be described in detail based on the following figures, wherein:

FIG. 3 is a table showing one example of a database;

FIG. 7 is a schematic view showing one example of a display of the retrieval result.

DETAILED DESCRIPTION OF THE INVENTION

Figure 1:
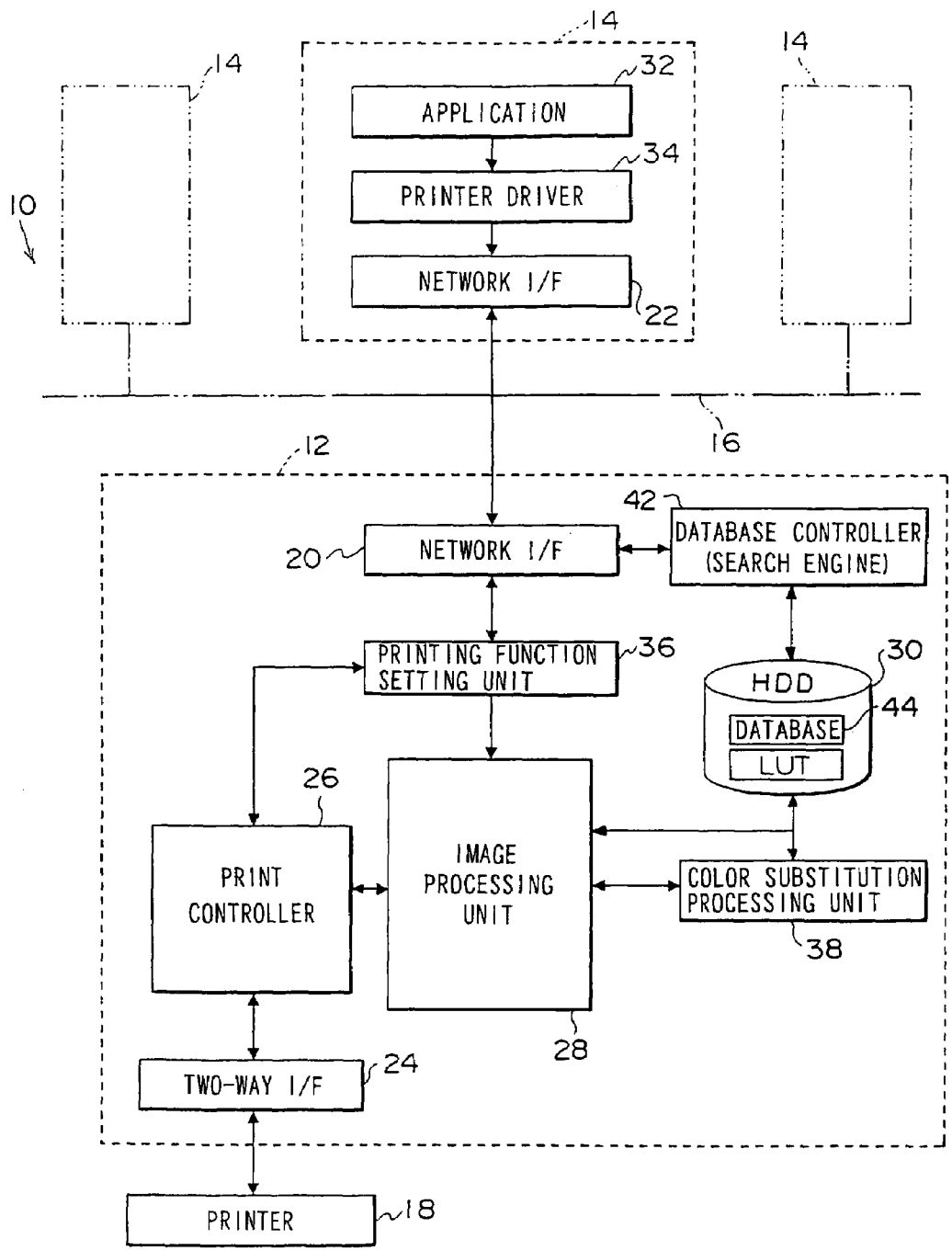
FIG. 1 is a schematic constitutional view of a print server to which an embodiment of the invention is applied.

Hereinafter, an embodiment of the invention will be described with reference to the drawings. FIG. 1 shows the schematic structure of a network 10 to which the embodiment is applied. This network 10 comprises a print server 12 provided as an image processor according to the invention and a plurality of client terminals 14 provided as image processing terminals, which are connected to each other through a communication line 16.

A printer 18 is connected to the print server 12 as a printing device, and upon receiving a printing job supplied from a client terminal 14, the print server 12 can print out the image according to the printing job.

Although a description will be made with the image processor used as a print server, the image processor of the invention is not restricted thereto, and may be any of various kinds of intermediate servers such as a file server that can process images while connected to the client terminals 14 through a network. Not only can the printer 18 be connected, but also a platesetter which exposes the image data on a photosensitive planographic printing plate in order to produce a printing plate, and an exposure device which exposes an original film used for image printing (exposure) on a photosensitive planographic printing plate.

Network interfaces (network I/F) 20 and 22 are respectively provided in the printer server 12 and the client terminal 14. The print server 12 and the client terminal 14 are connected to a communication line 16 through the network I/F 20 and 22 respectively. The print server 12 is provided with a two-way interface (two-way I/F) 24 and connected to the printer 18 through this two-way I/F 24.

A plurality of printers 18 may be connected to the print server 12, and it also may include a plurality of or various kinds of the two-way I/Fs 24. A connection with any network protocol can be used for a network connection between the client terminals 14 and the print server 12.

This print server 12 can be formed by adding a PCI board having a predetermined function to a personal computer (PC). The print server 12 is provided with input devices, such as a keyboard and a mouse, and display devices, such as a CRT display and an LCD display, and it may be provided with the WYSIWYG function for processing the image displayed on the display device and for printing out the display image.

The print server 12 comprises a print controller 26 for controlling the print server 12 itself as well as the printer 18, an image processing unit 28, and a HDD 30 that is a storage unit for storing various kinds of data. The image processing unit 28 performs Raster Image Processing for creating raster data based on the image data entered from the client terminal 14 as a printing job or the job data such as a drawing instruction.

The print server 12 stores an input printing job into a waiting queue, sequentially reads the printing jobs stored in the waiting queue, performs the image processing (Raster Image Processing) on them, stores the processed data (raster data) to be supplied to the printer 18 into a waiting queue for printing, and sequentially supplies the data to the printer 18 from this waiting queue. The print server 12 has the general structure of storing, into a holding queue, a job in which printing processing is not specified or a job in which printing processing is impossible. This print server 12 can use various kinds of conventional well-known structures and detailed description thereof is omitted in this embodiment.

The client terminal 14 is provided with a DTP application (hereinafter, referred to as application 32). Using this application 32, it can perform the image processing including creating, processing, and editing of images and/or documents, and can create the image data or a drawing instruction (hereinafter, referred to as image data) for printing, with a press plate including a page layout.

The client terminal 14 is provided with a printer driver (driver software) 34, and through this printer driver 34, it can transmit a job (printing job) including the image data and various kinds of processing instructions such as a page layout created through the application 32, to the print server 12. At this time, the printer driver 34 can set various kinds of printing functions.

The client terminal 14 can set various kinds of settings for the print server 12 by using this printer driver 34.

The print server 12 is provided with a printing function setting unit 36, which, upon receiving a job such as a printing job, can set various kinds of printing functions specified in the printing job. The print server 12 can set the conventional well-known printing functions. The printing function setting unit 36 checks a printing function specified by the printing job and sets the function so as to be performed by the print controller 26 and the image processing unit 28. In this embodiment, detailed description thereof is omitted.

The print server 12 is provided with a color substitution processing unit 38. The color substitution processing unit 38 substitutes color in a drawing object including a color-specified image and/or letter according to the setting when substitution of a specified color is set.

In the print server 12, the HDD 30 provided as a storage unit stores the L*a*b* values for every spot color previously set other than the process colors including cyan (C), magenta (M), yellow (Y), and black (K) and a table (profile) for converting L*a*b* values into CMYK values.

When color substitution with a spot color is specified for any color plate of the process colors, the color substitution processing unit 38 updates the color information (exchanges) and creates new color information, referring to the L*a*b* values of the corresponding spot color and a look-up table (LUT) for converting these L*a*b* values into CMYK values which are stored in the HDD 30. In other words, the color substitution processing unit 38 creates new color information (CMYK values) by combining the CMYK values excluding the color plate specified for color substitution with the CMYK values of the spot color specified for color substitution.

As a result, for example, two of the process colors are used to create the image data and/or document data for two color printing, the spot color different from the process color can be used to perform printing for one of the two colors or the both.

Namely, the color substitution processing unit 38 can perform the simulation of printing processing by using an ink different from the process color when printing out with a press plate.

In this color substitution processing, for example, the CMYK output area and the CMYK color compensation area are secured in a memory (not illustrated) provided in the image processing unit 28, and the CMYK values (the CMYK values converted from the L*a*b* values) of the spot color is stored in the CMYK output area at the time of performing the image processing on an image (image object) of the printing job.

The CMYK values of the process color used for the corresponding image object are stored in the CMYK color compensation area. After performing the color compensation on the CMYK values stored into the CMYK color compensation area, the compensated CMYK values are combined with the CMYK values stored in the CMYK output area, so that the new color information for the corresponding drawing object is created and supplied.

The print server 12, being provided with this color substitution processing unit 38, can simulate the N-color printing using the spot color. Any structure can be applied to the color substitution processing and its detailed description thereof is omitted in this embodiment.

The printer driver 34 provided in the client terminal 14 can set settings for the N-color printing simulation which is provided as a function of the print server 12. The N-color printing simulation on the client terminal 14 can be set by using a user interface (UI).

The print server 12 is provided with a database controller 42. The HDD 30 stores the data controlled by the database controller 42 in a database 44.

The database controller 42 stores the combinations of spot colors or the combinations of a spot color and a process color at the time of performing the N-color printing simulation, in the database 44 within the HDD 30, according to a key word.

This key word is determined under a condition such that, for example, when forming an object in two colors, the coloring and the color tone capable of accurately representing the object should be obtained.

Namely, if the object is an image of food, the keyword should be one by which the coloring and the color tone for obtaining at least the clear food image according to the combination of colors is obtained, and preferably it should be a keyword capable of representing freshness or the like.

This database 44 can register combinations of different colors with the same (common) key word. In other words, with one key word, two and more combinations can be registered, and, at this time, a combination in which one color is replaced with an approximate color can be separately and newly registered in the database 44.

Further, by setting a new key word, the database 44 can newly register a combination of the same colors or a combination in which one color is substituted with an approximate color. In short, a combination of two spot colors and a combination of one spot color and one process color can be registered with a desired key word.

The database controller 42 is provided with a search engine, and the search engine is activated from the client terminal 14, to thereby extract a combination of spot colors or a combination of a spot color and a process color with a key word.

A user can register a combination of a process color and a spot color or a combination of two spot colors together with a key word by using a predetermined user interface (UI), according to an operation of the print server 12 or an instruction from the printer driver 34 provided in the client terminal 14.

A prohibited combination of colors can be registered in the database 44 as prohibitory information. This prohibitory information can be registered by setting in the print server 12 or from the client terminal 14.

When registering a combination of colors based on a key word, the database controller 42 provided in the print server 12 checks whether or not a corresponding combination of the colors has been registered as the prohibitory information, and when the combination of the colors to be registered is specified as being prohibited in the prohibitory information, the combination is prohibited.

The image data or drawing instruction created, processed, and edited through the application 32 is transmitted as a printing job from the client terminal 14 to thus constituted print server 12. Upon receiving the printing job, the print server 12 performs the image processing and/or the printing processing based on the received printing job.

When the print server 12 receives the printing job, the printing function setting unit 36 reads and sets a printing function. The image processing unit 28 performs the image processing based on the set printing function and the Raster Image Processing for creating raster data with respect to the image data or the drawing instruction of the printing job.

The raster data created by the image processing unit 28 is supplied to the printer 18 at a predetermined timing and printed out by the printer 18 based on the printing job.

The print server 12 can perform a simulation of N-color printing as a printing function. In the N-color printing simulation, a color plate to be used is set by using the user interface (UI) in the client terminal 14. For example, when there are images of C plate, Y plate, M plate and K plate, a user sets a color plate to be used. A color at the time of drawing with the color plate is set depending on necessity.

Figure 2:
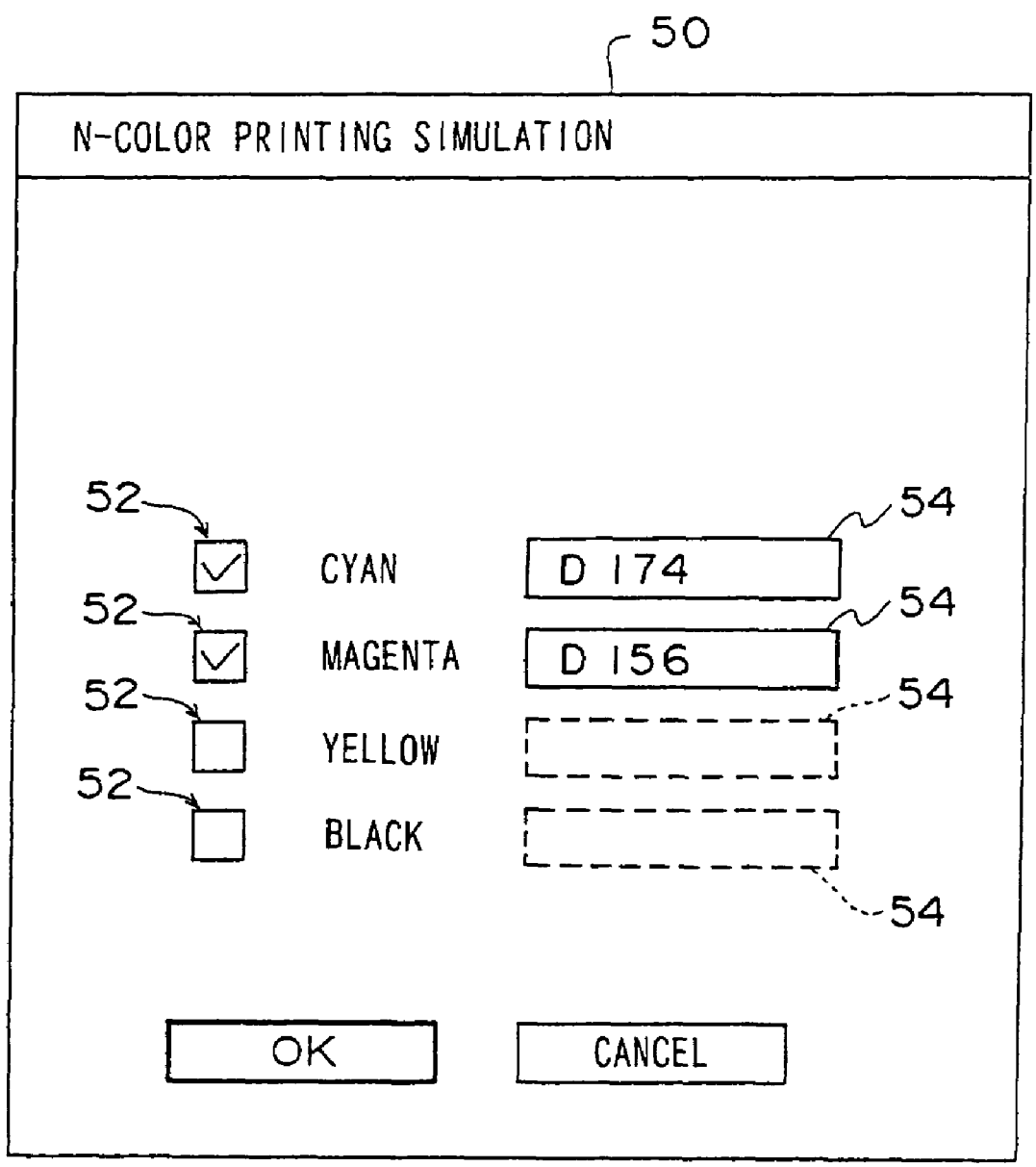
FIG. 2 is a schematic diagram of a setting dialog showing one example of a user interface for use in setting a simulation of N-color printing.

FIG. 2 shows a setting dialog 50 as one example of the user interface applicable to the setting of the N-color simulation. In this setting dialog 50, it is possible to select whether or not each color of C, M, Y, and K is output and specify the color when it is selected.

For example, in the setting dialog 50, the output of each color, cyan (C plate), magenta (M plate), yellow (Y plate), and black (K plate), is specified through marking a check box 52. Further, color substitution can be set by entering the name of color into the combo box 54 for the output color plate.

For example, when the check boxes 52 are marked corresponding to the outputs of cyan (C plate) and magenta (M plate), "D 174" which is set as the spot color is entered into the combo box 54 corresponding to the C plate, and "D 156" which is set as the spot color is entered into the combo box 54 corresponding to the M plate, it is possible to perform the two-color printing simulation by using the two colors "D174" and "D156" (spot colors) which are different from the process colors.

There are thousands of types of custom inks including approximate color, which are different from the process colors C, M, Y, and K. In the two-color printing simulation alone, there exist tens of thousands of combinations.

Even when performing the two-color printing simulation, it is preferable that a combination will be selected depending on an image (object) to be formed. Namely, by setting a proper combination of colors depending on the object to be printed in two colors, a visual effect, which is superior to that in the full color printing, can be obtained, and therefore, preferably, a suitable combination of colors should be selected properly according to the object.

In the print server 12, the HDD 30 is provided with the database 44 in which the combinations of two spot colors and the combinations of a spot color and a process color are stored. In this database 44, an object which can obtain a high visual effect by using one of the color combinations is registered and controlled with a key word, thereby enabling the key word retrieval.

The outline of the N-color printing simulation by using the database 44 will now be described.

FIG. 3 shows an example of the database 44 stored in the HDD 30. In this database 44, the combinations of two spot colors and the combinations of a spot color and a process color which are previously set according to a key word 1 for broad classification and a key word 2 for detailed classification are stored. FIG. 3 mainly shows combinations of two spot colors.

It is possible for a user to register a combination of colors in the database 44, via the print server 12 or via the client terminal 14. Since the prohibitory information including the prohibited combinations of colors is registered in the database 44, the prohibitory information is also stored there. When a combination of colors is registered in the database 44 and the combination corresponds to the prohibitory information, the combination is prohibited.

Figure 4:
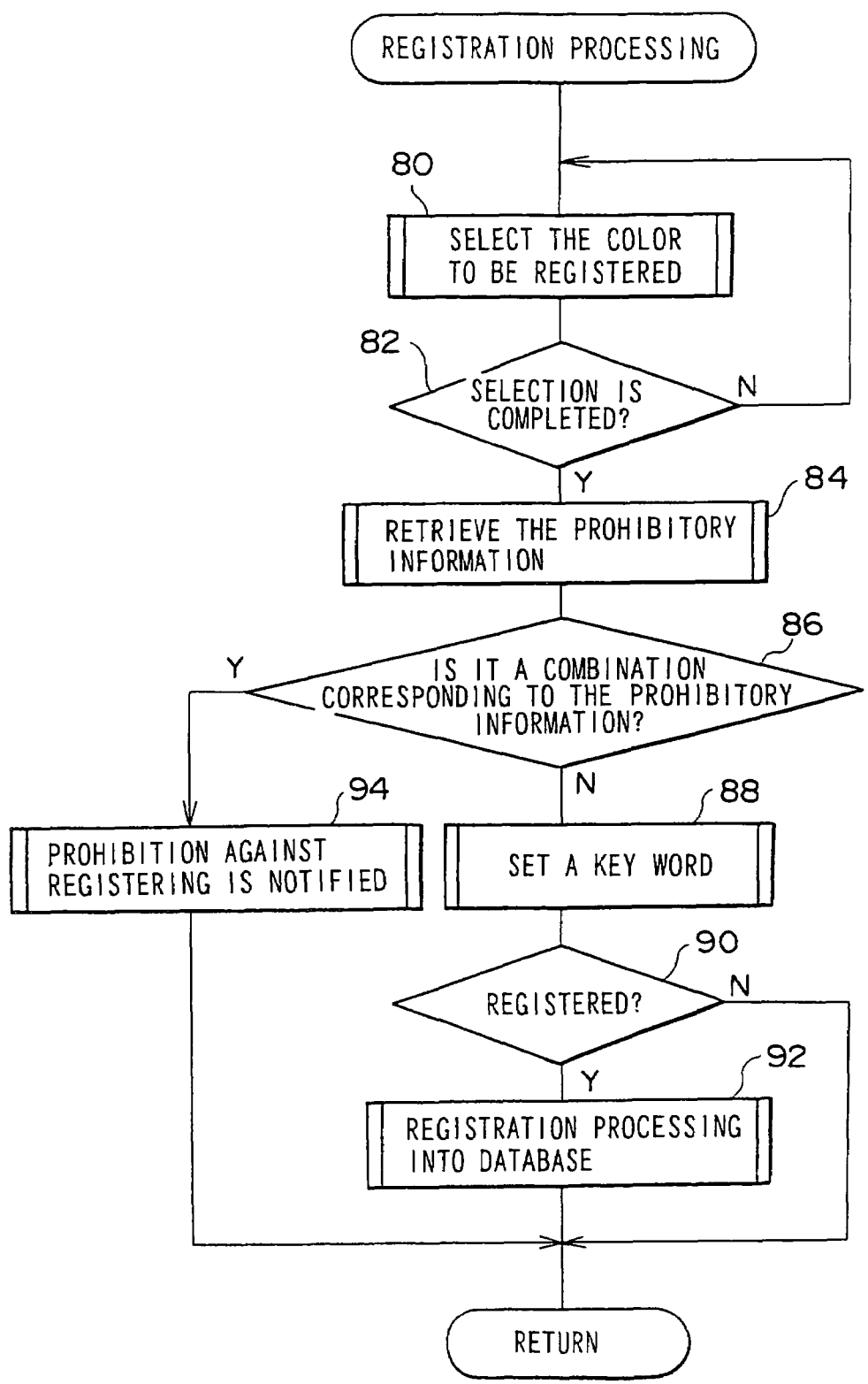
FIG. 4 is a flow chart showing an outline of registration processing for building up the database.

The outline of registering color combinations in the database 44 will now be described. FIG. 4 shows the outline of registering a color combination into the print server 12. Below, a flow of the processing between the print server 12 and the client terminal 14 will be described, as an example, in a case where a user registers a color combination via the client terminal 14.

In this flow chart, the processing starts when a user opens a user interface (UI) (not illustrated) provided for registration in the client terminal 14, and in the initial step 80, a color to be registered is selected. When a combination of two colors is registered, the two colors are selected.

Figures 5A, 5B:
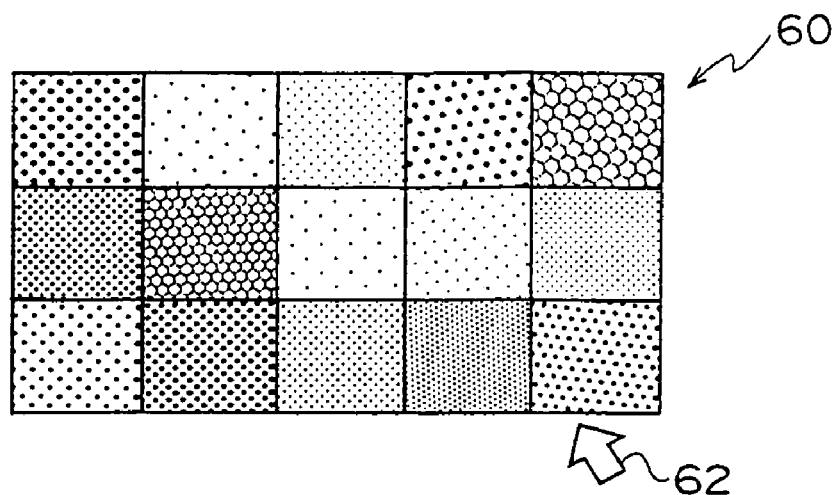
FIG. 5A is a schematic view showing an example of color patches for use in selecting a spot color to be registered.
FIG. 5B is a schematic view showing a display example of candidate spot colors retrieved.

When selecting the color to be registered, color patches 60, such as shown in FIG. 5A, are displayed on a monitor (not illustrated) in the client terminal 14, and a user specifies a patch of the desired color or a patch approximate to the desired color, with a cursor 62.

When a color is selected from the color patch 60, the print server 12 searches for and extracts the spot color or the approximate spot color corresponding to the L*a*b* values of the selected color, according to these L*a*b* values and the L*a*b* values of respective spot colors stored in the HDD 30.

When the color to be registered is selected, for example, the L*a*b* values of the corresponding color are entered. At this time, the corresponding spot color or the approximate spot color may be extracted from the entered L*a*b* values and the L*a*b* values of the respective spot colors stored in the HDD 30.

The spot color extracted as described above is displayed on the monitor (not illustrated) of the client terminal 14 as a candidate color for registration. Here, a list of names of spot colors extracted as candidate colors is displayed in FIG. 5B, so that a spot color can be selected from the displayed spot color names (FIG. 5B shows the state in which the spot color name "D173" is selected).

When the spot color is selected, Step 82 obtains an affirmative result, and the process proceeds to Step 84 in the flow chart of FIG. 4. When a combination of two spot colors is selected, two spot color names are selected, and when a combination of three spot colors is selected, three spot color names are selected. When a user tries to register a combination of a spot color and a process color, he or she may select the color name of a process color as one spot color name.

The prohibitory information is retrieved in Step 84, and it is checked in Step 86 whether or not the combination of the selected spot colors is a prohibited one. In other words, the print server 12 can set a prohibited combination of colors, and the prohibited combination of the colors is registered in the database 44 in advance as the prohibitory information. Here, a user can register a prohibited combination of colors that is the prohibitory information, with an arbitrary user interface.

The prohibitory information can be represented by using each prohibited combination of spot colors, for example, as illustrated in the table 1. Each combination of these spot color names is registered.

TABLE 1

| 1 | D123 | D456 | — | — |
|---|------|------|---|---|
| 2 | T234 | T567 | — | — |
| 3 | P345 | P678 | P789 | — |
| ... | ... | ... | ... | |
| ... | ... | ... | ... | |
| ... | ... | ... | | |

When each prohibited combination of colors is registered as the prohibitory information, it is checked whether or not the selected colors correspond to one of the above combinations.

The prohibitory information can also be represented by using a combination of L*a*b* values. Here, a range is set for each of the L* value, the a* value, and the b* value, for example, as illustrated in the table 2.

TABLE 2

| | L*: a-b | L*: s-t | — | — |
|---|---------|---------|---|---|
| 1 | a*: c-d | a*: u-v | — | — |
| | b*: e-f | b*: w-x | — | — |

Here, whether or not a combination is the prohibited combination is judged according to whether or not the L*a*b* values of each selected spot color are included in the L*a*b* values of the prohibited combination.

When the selected spot color combination does not correspond to the prohibited combination, Step 86 obtains a negative result, and the process proceeds to Step 88. In Step 88, a key word is set. As the key word at this time, both of a key word for broad classification and a key word for detailed classification are set.

When registration is performed by setting a key word, Step 90 obtains an affirmative result, and the process proceeds to Step 92. In Step 92, a combination of the selected spot colors is registered in the database 44, according to the set key word.

Thus, the database 44 can be configured as shown in FIG. 3, and the database 44 can then be expanded.

In contrast, when the combination of the selected spot colors corresponds to a prohibited combination, Step 86 obtains an affirmative result, and the process proceeds to Step 94.

In Step 94, a notification that the combination of the selected spot colors is prohibited is made to the client terminal 14 which is performing the registration processing, and then, the registration processing is finished. In other words, the processing is finished without registering the combination of the selected spot colors.

Thus, it is possible to prevent the combined spot color from corresponding to any of the registered spot colors.

Figure 6:
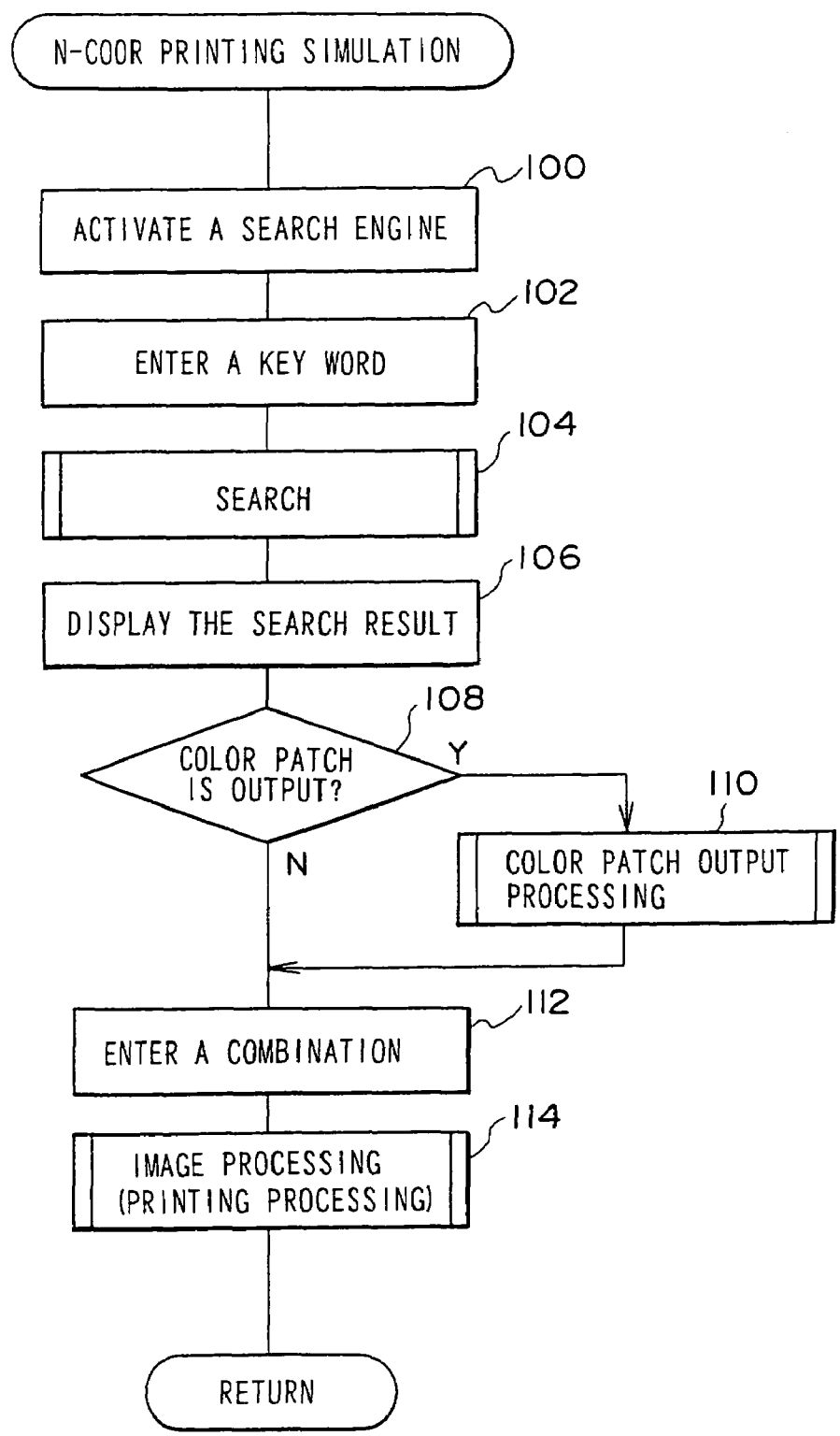
FIG. 6 is a flow chart showing one example of the processing of an N-color printing simulation using retrieval.

FIG. 6 shows the outline of the processing of an N-color printing simulation such as a two-color printing simulation by using the database 44 of the combinations of the spot colors registered thus.

When the N-color printing simulation is performed by using the database 44, at first, a search engine provided in the database controller 42 of the print server 12 is activated by the client terminal 14 in Step 100. Thus, a search screen is displayed on the monitor (not illustrated) of the client terminal 14.

Thereafter, a key word for search (key word 1 or key word 1, 2) is entered in Step 102, to search the database 44 in Step 104.

As a result, the search result is displayed in Step 106. FIG. 7 shows one example of the display window 56 as the search result, and in the display window 56, for example, "food" is entered as the key word 1 and "fish" is entered as the key word 2. As a result, combinations of spot colors classified according to these key words 1 and 2 are displayed on the monitor (not illustrated) of the client terminal 14.

Then, a user selects a combination of the spot colors. When there are plural combinations, color patches of the respective combinations can be output. Here, for example, a button (not illustrated) for selecting the creation of a color patch may be provided in the display window 56.

In the flow chart of FIG. 6, whether or not a color patch is output is checked in Step 108, and when a color patch is output, Step 108 obtains an affirmative result, and the process proceeds to Step 110, where the printing processing of the color patch is performed.

In other words, when the output of the color patch is established in the client terminal 14, the print server 12 outputs the color patch of the corresponding combination of the spot colors. A color patch may be output by specifying one combination or may be output by selecting plural combinations from the search result. Alternatively, color patches may be output for all of the combinations searched.

Figure 8:
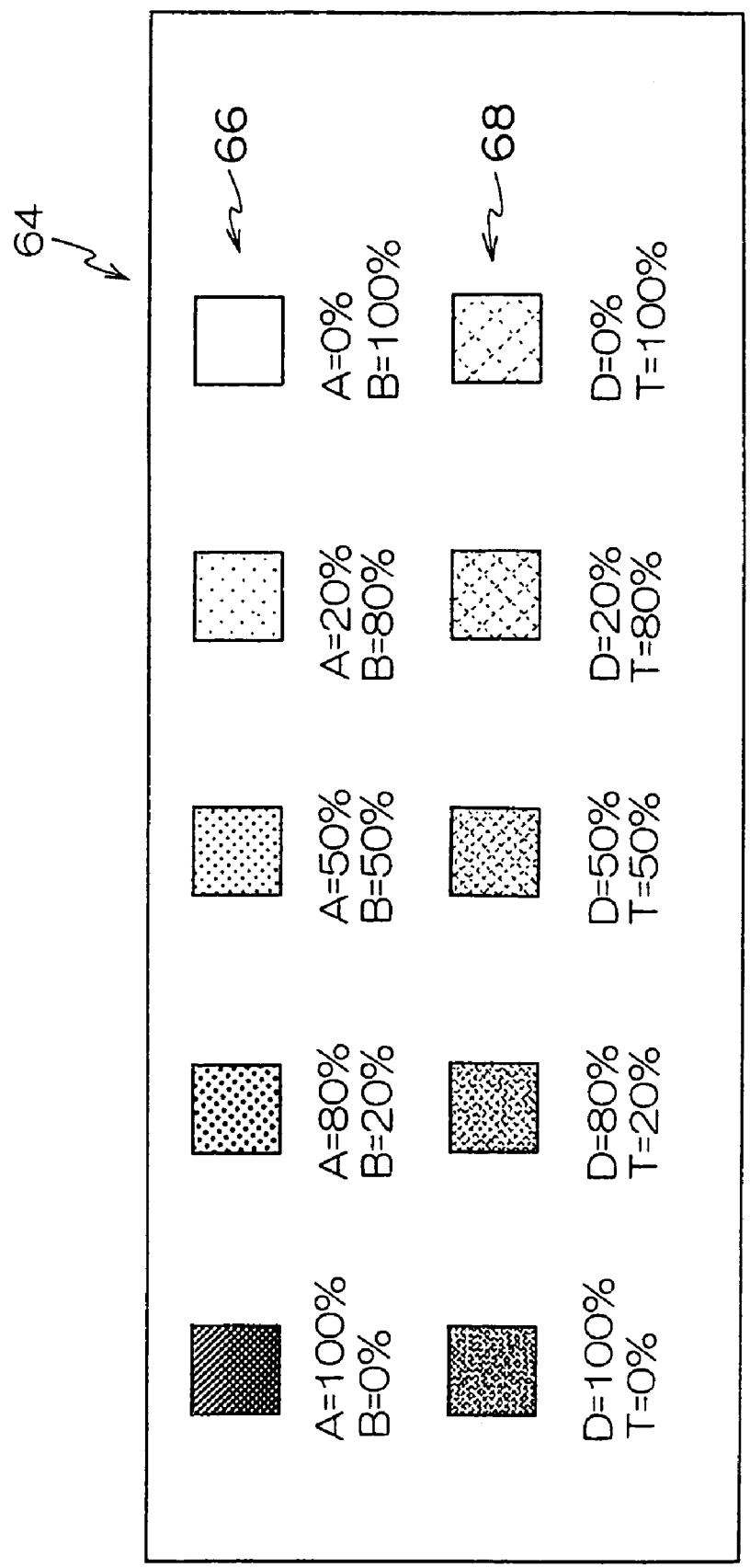
FIG. 8 is a schematic view showing one example of color patch output for use in selecting a combination of spot colors.

FIG. 8 shows an output example of color patches. In the color patch output 64, when the extracted combination includes two combinations, e.g., the combination of the spot color A and the spot color B and the combination of the spot color D and the spot color T, the print server 12 outputs color patches in which densities of the respective colors are varied.

For example, patches 66, in which A=100% and B=0%, A=80% and B=20%, A=50% and B=50%, A=20% and B=80%, and A=0% and B=100%, respectively, are output for the combination of the spot color A and the spot color B. Similarly, patches 68 in which densities (density ratios) are varied are output as for the combination of the spot color D and the spot color T.

As for the combinations of the densities of the spot colors, each object may be set in advance according to each key word, and the set object may be output with the densities of the combined spot colors being varied.

By the use of this color patch output 64, it is possible to properly select a combination of the spot colors for use in the N-color printing simulation.

After selecting a combination of the spot colors, a user enters the selection result in the next Step 112. Namely, after opening the setting dialog 50 shown in FIG. 2, he or she enters the selected combination of the spot colors into the combo boxes 54. The display screen of the selection result may cooperate with the setting dialog 50 in order to input the spot colors.

Through setting the N-color printing simulation and instructing the printing processing in these ways, the print server 12 performs the N-color printing simulation (printing processing) according to this instruction (Step 114 in FIG. 6).

According to the above structure, it is possible to easily select a proper combination of colors according to an object. By use of the combination of the colors selected as described above, it is possible to create an image for the N-color printing having the proper color combination suitable for the object.

The database controller 42 may be designed to store, for example, the color combinations used for the printing simulation, to set sub-numbers (refer to FIG. 3 and FIG. 7) depending on the number of times the color combinations are used, and to display the combinations in the order of the sub-numbers. This makes it easy to find an effective color combination.

Alternatively, the name of a maker (manufacturer) of the spot colors may be included in the search conditions, and the colors of the search result may be displayed in combination with approximate colors.

When the approximate colors are displayed, the color patches can be printed out with the approximate colors, the N-color printing can be simulated with the approximate colors, and when a preferred simulation result is obtained, the simulation result can be registered in the database 44. Thus, the database 44 can be enhanced.

Any key word may be set, or the same combination may be registered with different key words. In short, coloring depends on a user's preference and there are various combinations accordingly. For example, when a key word is get again for each user at this stage, it is possible to reproduce a combination of the colors according to a user's preference easily and properly.

Although the embodiment has been described by taking the two-color printing simulation as an example, it can be applied to three-color printing and four-color printing. According to an increase in the number of colors, in particular, the number of the combinations increases, and therefore, it can be effectively used while controlling the color combinations properly.

As mentioned above, a first aspect of the invention is to provide an image processor for performing image processing according to image data or a drawing instruction entered from an image processing terminal, the processor comprising: a storing unit in which combinations of one or more process colors and/or one or more spot colors that is/are different from the one or more process colors are stored according to predetermined key words; and a searching unit for extracting and supplying one or more combinations of one or more process colors and/or one or more spot colors stored in the storing unit according to an entered key word.

According to the first aspect of the invention, the combinations of only the spot colors and the combinations of a spot color and a process color are stored into the storing unit according to predetermined key words, and the searching unit can search for a combination of one or more process colors and/or one or more spot colors with the key word and supply it.

At this time, since a key word can be entered from the image processing terminal and the search result can be supplied to the image processing terminal, it is possible to search for a combination of only the spot colors and a combination of the spot color and the process color accurately with the key word in the image processing terminal.

As a result, it is possible to obtain the same combination of colors as was used before, easily and accurately. Further, it is possible to select a proper combination of colors depending on an object or the like when two-color printing is carried out.

According to a second aspect of the invention, the image processor further comprises a substitution unit which, when color substitution and a substituted color are set for a process color of the image data or drawing instruction, substitutes color information of the process color with color information of the substituted color and creates new color information according to the image data or drawing instruction, and an image processing unit which performs the image processing depending on the image data or drawing instruction, according to the color information substituted by the substitution unit, wherein color information for each spot color is stored in the storing unit, and the substitution unit creates new color information based on the color information stored in the storing unit.

According to the second aspect of the invention, combinations of spot colors as well as the color information of the spot colors are stored in the storing unit. When color substitution is set for one of the process colors, the substitution unit creates the color information so that the corresponding process color can be converted into the substituted color.

When color substation is specified for one of the process colors, color substitution is performed on the corresponding process color. At this time, the color information stored in the storing unit is used.

Thus, since the color substitution is set according to the combination of only the spot colors or the combination of the spot color and the process color searched with a key word, the set color substitution can be accurately performed.

In a third aspect of the invention, a color patch is formed according to the combination of one or more process colors and/or one or more spot colors based on the search result of the searching unit.

According to the invention, since a color patch of the color combination based on the search result can be supplied, it is possible to properly check whether or not a desired combination has been obtained. Further, it is possible to select a color combination capable of obtaining a desired result.

In the first to the third aspects of the invention, the image processor may comprise a registering unit for registering the key words and the combinations of one or more process colors and/or one or more spot colors in the storing unit.

As a result, a desired combination of one or more process colors and/or one or more spot colors can be assuredly reproduced and used.

Further, it is preferable that prohibitory information representing a prohibited combination of one or more process colors and/or one or more spot colors is stored in the storing unit and that the image processor further comprises a prohibiting unit which prohibits a combination of one or more process colors and/or one or more spot colors based on a key word registered by the registering unit, according to the prohibitory information.

As a result, it is possible to prevent production of a color approximate to some spot color, as a result of combination of one or more process colors and/or one or more spot colors and to prevent re-registering of a color combination already registered.

Further, the image processor of the invention may comprise a prohibitory information registering unit for registering the prohibitory information in the storing unit.

As set forth hereinabove, according to the invention, the combinations of only the spot colors and the combinations of a spot color and a process color are stored into database according to key words, which makes it easy to select a desired color combination and to reproduce a combination selected before. Further, provided with the prohibiting unit, the invention can effectively exclude an indistinguishable color combination in advance.

The above-described embodiment is intended to show one example of the invention and not to restrict the structure of the invention. For example, although the embodiment has been described by taking the print server 12 as an example, the invention can be applied not only to the print server 12 but also to an image processing unit of any structure that can perform the image processing based on the image data or drawing instruction created by the client terminal 14.

What is claimed is:

1. An image processor comprising:
   a storing unit that stores at least one of one or more process colors and one or more spot colors that are different from the one or more process colors according to a predetermined key word;
   a searching unit that extracts the one or more process colors and the one or more spot colors stored in the storing unit according to an entered key word;
   a substitution unit that, when color substitution and a substituted color are set for a process color of an image data or a drawing instruction entered from a terminal, substitutes color information of the process color with color information of the substituted color and creates new color information according to the image data or the drawing instruction; and
   an image processing unit that performs image processing depending on the image data or the drawing instruction, according to the new color information substituted by the substitution unit,
   wherein color information for each spot color is stored in the storing unit, and the substitution unit creates the new color information based on the color information stored in the storing unit.

2. The image processor according to claim 1, wherein a color patch is formed according to at least one of the one or more process colors and the one or more spot colors extracted by the searching unit.

3. The image processor according to claim 1, further comprising:
   a registering unit that registers the key word and at least one of the one or more process colors and the one or more spot colors in the storing unit.

4. The image processor according to claim 1, wherein prohibitory information representing a prohibited combination of one or more process colors and one or more spot colors is stored in the storing unit.

5. The image processor according to claim 4, wherein the register unit prohibits a combination of one or more process colors and one or more spot colors from being registered based on the prohibitory information.

6. The image processor according to claim 4, further comprising a prohibitory information registering unit that registers the prohibitory information in the storing unit.

7. The image processor according to claim 1, wherein the searching unit provides a search result to a user terminal.

8. The image processor according to claim 1, wherein each key word includes a first key word for broad classification and a second key word for detailed classification.

9. The image processor according to claim 1, wherein the storing unit stores same combination of one or more process colors and one or more spot colors with different key words.

10. The image processor according to claim 1, wherein the color information for each spot color includes L*a*b* values of the spot color.

11. The image processor according to claim 10, wherein the storing unit stores a look-up table for converting the L*a*b* values of each spot color into CMYK values.

12. The image processor according to claim 4, wherein the prohibitory information is represented by using a combination of L*a*b* values.

13. The image processor according to claim 4, wherein the prohibitory information is represented by a range setting for each of the L* value, the a* value, and the b* value.

14. A image processing method comprising:
   storing at least one of one or more process colors and one or more spot colors that are different from the one or more process colors according to a predetermined key word;
   extracting the one or more process colors and the one or more spot colors stored in a process of storing, according to an entered key word;
   substituting, when color substitution and a substituted color are set for a process color of an image data or a drawing instruction, color information of the process color with color information of the substituted color and creating new color information according to the image data or the drawing instruction; and
   performing image processing depending on the image data or the drawing instruction, according to the new color information.

15. The image processing method according to claim 14, wherein color information for each spot color is stored in the process of storing, and a process of substituting creates new color information based on the color information.

16. The image processing method according to claim 14, further comprising:
   forming a color patch according to at least one of the one or more process colors and the one or more spot colors.

17. The image processing method according to claim 14, further comprising:
   registering the key word and at least one of the one or more process colors and the one or more spot colors; and
   prohibiting a combination of the one or more process colors and one or more spot colors from being registered based on prohibitory information representing a prohibited combination of the one or more process colors and one or more spot colors.

18. An image processor comprising:

a storing unit that stores at least one of one or more process colors and one or more spot colors that are different from the one or more process colors according to a predetermined key word; and a searching unit that extracts the one or more process colors and the one or more spot colors stored in the storing unit according to an entered key word, wherein prohibitory information representing a prohibited combination of one or more process colors and one or more spot colors is stored in the storing unit.

* * * * *